Feb. 23, 1954 O. C. BREWSTER 2,669,864
PNEUMATIC BORE GAUGE
Filed Jan. 8, 1948 3 Sheets-Sheet 1
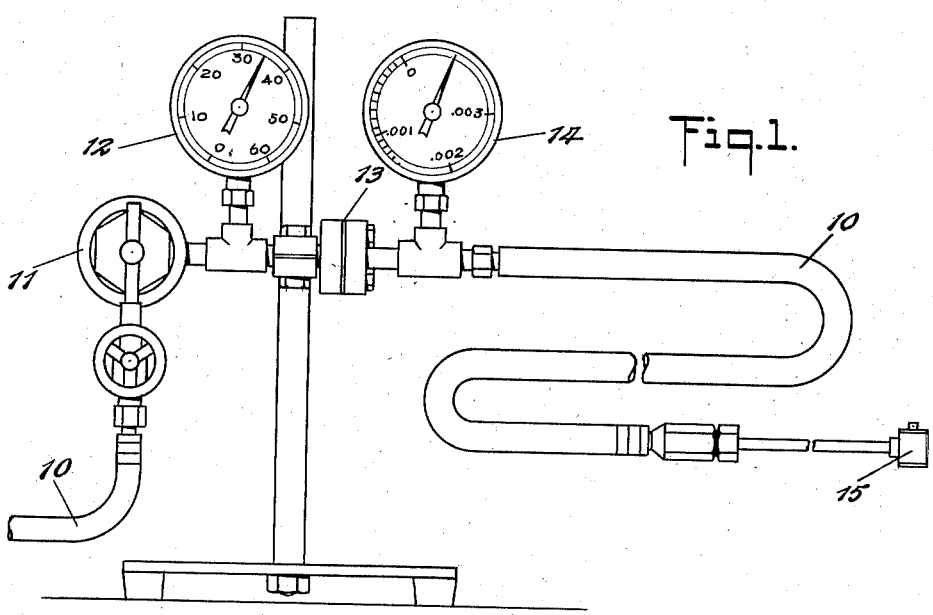
Fig.1.
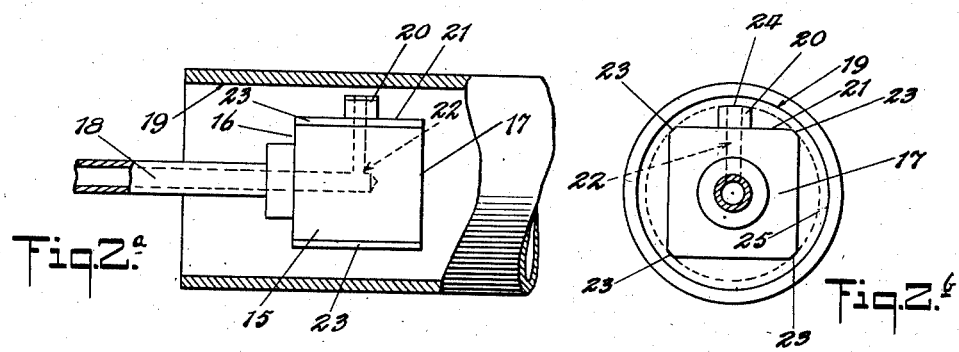
Fig.2.ᵃ  Fig.2.ᵇ
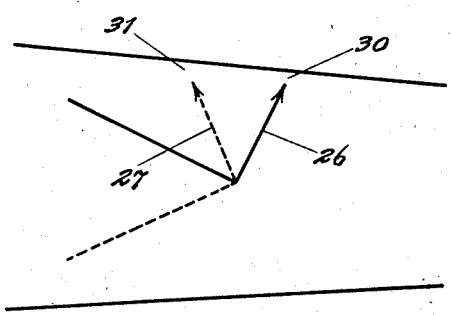
Fig.3.
INVENTOR.
OSWALD C. BREWSTER
BY
Davis Hoxie & Faithfull Feb. 23, 1954
O. C. BREWSTER
2,669,864
PNEUMATIC BORE GAUGE
Filed Jan. 8, 1948
3 Sheets-Sheet 2
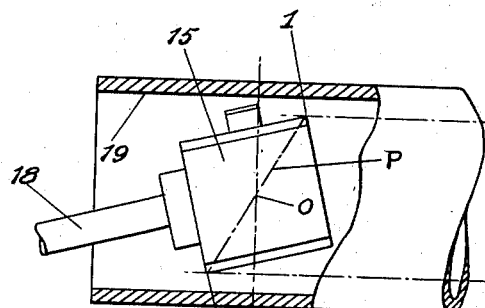
Fig.4ᵃ
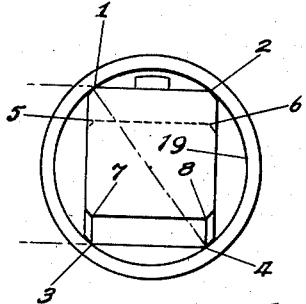
Fig.4ᵇ
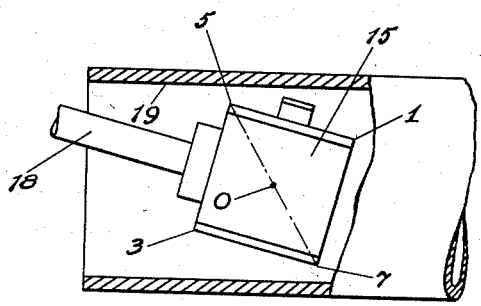
Fig.4ᶜ
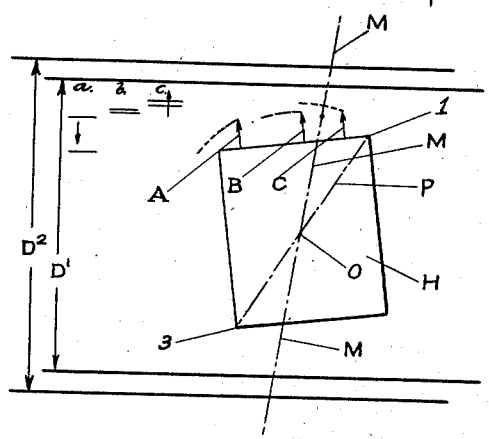
Fig.5ᵃ
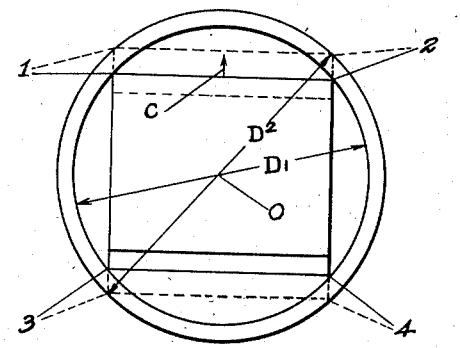
Fig.5ᵇ
INVENTOR.
OSWALD C. BREWSTER
BY
Davis Hoxie & Faithfull Feb. 23, 1954
O. C. BREWSTER
PNEUMATIC BORE GAUGE
2,669,864
Filed Jan. 8, 1948
3 Sheets-Sheet 3
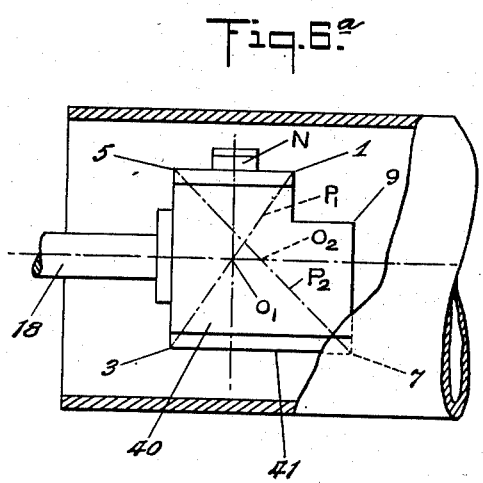
Fig. 6.ª
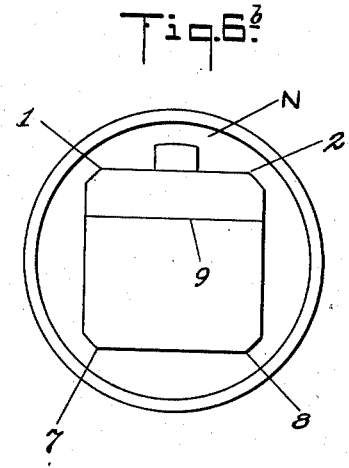
Fig. 6.ᵇ
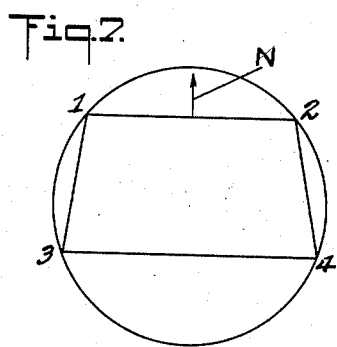
Fig. 7.
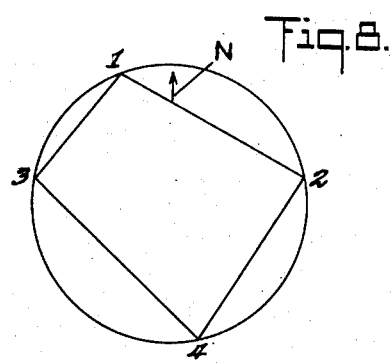
Fig. 8.
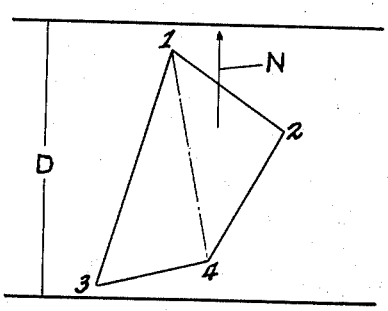
Fig. 9.ª
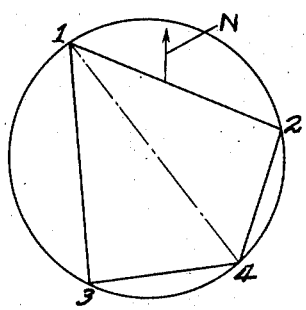
Fig. 9.ᵇ
INVENTOR.
OSWALD C. BREWSTER
BY
Davis Hoxie & Faithfull Patented Feb. 23, 1954

2,669,864

UNITED STATES PATENT OFFICE 2,669,864

PNEUMATIC BORE GAUGE

Oswald C. Brewster, Litchfield, Conn.

Application January 8, 1948, Serial No. 1,085

13 Claims. (Cl. 73—37.5)

This invention has to do with a pneumatic bore gage, and gives an improved form of gaging head for such instruments.

Use of a pneumatic gage to measure distance, including variation from a standard dimension, is well known. See the British patent of Guy, 202,691, and the U. S. patents of Mennesson, 1,982,528 and 2,026,187. In such instruments a fluid is delivered under constant pressure through a fixed orifice and then is vented through an orifice formed between an outlet in the head of the instrument and a surface of the object to be gaged. The fluid pressure in the region between the two orifices is then dependent on the size of the escape orifice, which is to say that it is dependent on the spacing of the outlet in the head from that surface. The head is so located that the outlet spacing (orifice size) is a function of the distance to be measured. By suitable calibration of an instrument responsive to the intermediate pressure determined by the size of the escape orifice, it is possible to get a measure of that dimension either absolutely or in terms of variation from some standard.

This principle has been adapted to the gaging of bores, that is to say, to the measurement of the internal diameter of generally cylindrical openings. More commonly it is used to get a measure of variation from a standard diameter against which the indicating or recording instrument is calibrated.

One proposal was to have the head rest with surface contact against the wall of the bore at one side of its axis (e. g., on the bottom side of a horizontal bore) with a nozzle part of the head extending transversely from the base into proximity with the wall on the opposite side but without touching it, thereby forming the fluid escape orifice. The dimension of the head from its supporting base part to the nozzle outlet being fixed, the spacing of the nozzle outlet from the opposite wall varies with the diameter of the bore; and, within the range of the particular head, variation in that spacing in bores of different diameters is reflected as variation in the fluid pressure and in the reading of the pressure responsive instrument. This type of instrument is capable of good accuracy, but it does not lend itself well to ready use because of the care needed in locating the supporting part properly in the bore; and it is not well adapted for use in vertical or near vertical bores because it then has to be held by some force other than gravity against the supporting wall of the bore, and accurate placement is hard to attain.

Another proposal, used in industrial practice, was to provide a head with two or more radial nozzles directed at the wall of the bore so that the head does not need to rest against the wall of the bore. The announced theory is that it makes no substantial difference whether the head is located so that the radial nozzle outlets are equally spaced from the wall or are differently spaced. The premise is that they jointly constitute an escape orifice the size of which is dependent on the diameter of the bore and not upon the position of the head within the bore or the spacing of any one nozzle outlet from the wall. Such gages are convenient but the degree of their accuracy is questionable; and the head construction is complicated and costly.

The present invention aims to improve upon known pneumatic bore gages in their form of gaging head by giving a better combination of simplicity, accuracy and versatility; by making it possible to use the head to learn readily whether a bore is a true cylinder and, if it is not, the direction and degree of taper; and by making it possible with a single head to obtain results over two ranges of diameter, one wider than the other, with a single pressure-responsive instrument operating over a single range of pressure.

The basic idea of means is to make the head with a number of outer contact corners which clear the wall of the bore in one position of the head to permit it to fit within the bore, but which simultaneously engage the wall at spaced points about the axis of the bore when the head is tilted axially within the bore, these contact corners being of such number and so located on the head that when it is tilted in a given direction the head can occupy but one possible position in which all these corners are in contact with the wall of the bore. In any given bore, this unique placement of the head when in full corner contact position determines a particular location of the fluid outlet in relation to the wall of the bore, and therefore defines a particular size of escape orifice. It therefore determines a particular fluid pressure in the intermediate pressure region between the escape orifice and the fixed orifice upstream in the fluid supply. In a bore of different diameter, however slight the difference, the unique full corner contact position to which the head can be tilted in the same direction is a position of different angular relation to the axis of the bore, and the fluid outlet is at a different distance from the wall, giving a different size of escape orifice and a different intermediate fluid pressure. By suitable calibration, these differences in pressure may be translated into indications of bore size or of variation from a standard size.

The basic advantages of such a head are several. First, it is a simple matter to tilt the head until it comes into its unique position of full corner contact. The sense of feel enables one to know certainly when that position is reached. Second, since that is a unique and positive position there is no error in placement of the head with consequent error in size of the escape orifice. Third, the shape of the head is such that it is simple to make a series of heads of progressively larger size by which to measure variations from a series of standard diameters, and to design each head of the series so that the range of variation in size of escape orifice, and hence of pressure variation and scale reading, is the same for all. This permits use of the same pressure system and indicator with all sizes of head. In addition to these basic advantages, special forms of head become possible which have special utilities in getting results not possible or not so readily possible with existing heads.

As with known gaging heads, this new one must be of such overall size that it can fit within the bore to be gaged; and there must be a head of different size for each range of diameter, since no such gage is useful over an indefinite range. The range of difference in diameter for which a gaging head is ordinarily used is a few thousandths of an inch, although this is a practical choice rather than an inherent limitation. Further, the head must have an internal fluid passage leading to an outlet at a point facing the wall of the bore so as to form the escape orifice. Within the limit of these common characteristics implicit in the fact that it is for use in a pneumatic bore gage, the new head may assume various shapes consistent with the particular features hereinafter described as the definitive characteristics of this invention. And likewise in accord with known practices, the new head may be mounted in a fixed position, as in bench work where the bore to be gaged is brought to the gage; or the head may be portable and mounted on any suitable handle, through which air may be supplied, to enable one to insert it in the bore and to manipulate it therein. In the following description, in terms of a portable head as an illustration, there is no intent to limit the invention to exclude a fixed head for use with a portable object having a bore to be gaged.

Fig. 1 is a view of the full bore gage assembly of which the gaging head forms a part.

Fig. 2a is a vertical section, taken longitudinally, through a bore in which one form of head embodying the invention is located in free position and Fig. 2b is an end elevation of the same.

Fig. 3 is a schematic diagram illustrating, in the case of a tapered bore, the difference in escape orifice incident to tilting of the Fig. 2 head in different directions.

Fig. 4a is a view like that of Fig. 2a but showing the same head tilted in one direction to a position of full corner contact with the wall of the bore, and Fig. 4b is an end elevation of the same; while Fig. 4c is a section like that of Fig. 4a but showing the head in the opposite direction of tilt to full contact position.

Figs. 5a and 5b are schematic diagrams to illustrate the effect upon orifice size of different locations of the nozzle on the head in relation to the axis of rotation.

Figs. 6a and 6b are side and end elevations of a head of different shape from that of Figs. 2 and 4 but embodying the basic idea together with a further idea of special utility.

Figs. 7-9 are skeletal drawings of a bore and head to illustrate the variation in shape of the quadrilateral figure defined by the contact points that is possible in embodying the basic idea.

None of these drawings is dimensionally correct because the purpose is to illustrate the ideas of means, which requires some exaggeration of spacings.

The assembly shown in Fig. 1 includes the supply line 10 which delivers a fluid, preferably air, under pressure; the automatic pressure regulator 11 of any type capable of maintaining a constant pressure, the pressure gage 12, which is optional but useful to show whether the constant supply pressure is being maintained at the desired value; the orifice plate 13 and the Bourdon gage or other indicating device 14 responsive to the variable pressure between the fixed orifice at 13 and the escape orifice at the head; and the rest of line 10 leading to the gaging head 15, here shown as a portable head carried on a handle to permit it to be inserted in a bore to be gaged. All of these elements correspond to the elements of known systems. The novelty here is in the head.

Figures 2a and 2b show a form of head which illustrates the basic idea and also embodies a further idea of means giving it a special utility beyond that of known pneumatic gaging heads.

The head 15 in these figures consists of a rectangular block having end faces 16 and 17. These end faces are preferably square. The hollow handle 18 through which air is supplied is connected to one of these end faces so that when the head is within the bore 19 to be gaged these end faces lie in planes generally transverse to the axis of the bore and intersecting that axis. The nozzle 20 projecting from one of the side faces 21 is threaded into the head and is in communication with the internal fluid passage 22 which leads from the inlet where the handle is attached. The nozzle outlet faces the wall of the bore and the head is of such size that this outlet lies close to the wall to form therewith a restricted fluid escape orifice.

To make it possible for the head to be within the bore it is necessary that its size and shape be such that its outermost corners, in some projection, lie within a circumscribed circle no larger than the smallest bore to be gaged with that particular head; and it is desirable that it be slightly smaller than that minimum bore. This is simply a geometrical expression of the fact that the head must be of such size and shape as to fit within the smallest bore to be gaged.

With this particular rectangular and square ended head (see Fig. 2b) I meet this limitation by giving the square transverse end faces an initial size such that their diagonals slightly exceed that minimum bore diameter. I then turn the head and cut and grind its axially directed edges 23 and the nozzle tip 24 on a circle 25 which is about .0015 inch smaller than that minimum bore diameter, thus easily getting not only a final accurate dimension but also rounded axial edges and a rounded nozzle tip, features which improve the ease of use, effectiveness and durability of the head.

Such a head, when tilted axially in one direction in the bore (see Figs. 4a and 4b) comes into contact with the wall at four points which are the diagonally opposite pairs of corners 1, 2 and 3, 4 of the transverse faces of the head. Tilting in the opposite direction (Fig. 4c) brings the head into contact at the other diagonally opposite pairs of corners 5, 6 and 7, 8. Either tilted position of full corner contact is the only such position which the head can occupy in that direction of tilting. The reason is that the four contacting corners define a transverse rectangular plane P which intersects the axis of the bore but is of such size that it can not be rotated about a transverse axis O. In a bore of different diameter a different degree of tilt is necessary to bring the head into a position of full corner contact, and in that position the nozzle mouth has a different spacing from the wall, forming a different size of orifice and causing a different intermediate fluid pressure.

In geometrical terms, the transverse plane defined by the four outer contact corners has diagonals which exceed the diameter of the largest bore to be gaged while one transverse dimension is less than the diameter of the smallest bore. Hence it can fit within the bore but when turned by tilting of the head it comes into contact at its four corners.

This particular head can be tilted in either axial direction about its central transverse axis O to a position of full corner contact. In a true cylinder, of given diameter, the spacing of the centrally located nozzle mouth from the wall is the same with either direction of tilt when the head is brought to its full corner contact position. That is because the nozzle is symmetrically located with respect to the two contact planes and those planes are identical in size and slope. However, few bores are true cylinders. Usually there is some degree of taper over any particular length of the bore, and it is often useful to be able to ascertain the existence, direction and extent of such taper. This symmetrical double-throw head makes that possible.

Fig. 3 is a schematic diagram which illustrates the action of this type of head in a tapered bore. The solid line 26 represents the head and nozzle in one position of full corner contact, and the dotted line 27 represents the same in the opposite direction of tilt. It is evident that because of the taper of the wall the spacing 30 (here exaggerated) of the nozzle mouth from the immediately adjacent wall in one tilted position is less than the spacing 31 in the opposite position. Thus, by tilting such a head first in one direction and then in the other to the full corner contact position, different intermediate pressures will result if there is a taper, and from the extent and direction of the difference in pressure one can ascertain the extent and direction of the taper. A close approximation of the average diameter can be had by averaging the readings in the two positions of tilt. This use of such a symmetrical double-throw head is illustrated in Figs. 4a, 4b and 4c.

The symmetrical double-throw arrangement of Figures 2 and 4 illustrates both the basic idea and the further idea touching the gaging for taper. If this latter special purpose is not to be served, a single-throw form of head may be used. A simple and preferred form of that can be understood upon consideration of the fact that in the Figure 4 form, for example, much of the structure has no function when the head is tilted in but one direction. Thus, in Figure 4a, representing downward tilting of the handle, only the corners 1, 2 and 3, 4 which define the rectangular plane P are significant. The other corners 5, 6 and 7, 8 could be absent, and there would be needed in a corresponding single-throw head only the structure necessary to form the fluid passage, the handle mounting and the four outer corners defining plane P.

It is possible also to make a double-throw head having a different special utility, namely, to permit gaging over one range of bore sizes with one direction of tilt and over a wider range with the other, and if desired, employing the same range of variation in size of the escape orifice and therefore the same pressure range for both. The characteristics of the head which make this possible are illustrated in Figures 5a and 5b; and in Figures 6a and 6b is shown a form of double-throw head based thereon and having the special utility just mentioned. The essential feature is that the nozzle outlet must be so located that it has a different relation to the axis of rotation of one contact plane from what it has in relation to the other.

Figures 5a and 5b show schematically the effect of the nozzle location with respect to the contact corners and the axis of rotation of the contact plane. The head H is shown in a position of full corner contact with a bore of diameter $D_1$, contact being at corners 1, 2 and 3, 4 defining plane P. Three nozzle locations A, B and C are represented by the three arrows, all of equal length. The spacing of the nozzle tips from the bore wall is greatly exaggerated. These arrows illustrate (a) a position remote from the contact corners 1, 2 and to the left of the axis of rotation; (b) a mid-position generally in line with the axis; and (c) a position near corners 1, 2 and to the right of the axis.

In a larger bore $D_2$, the head would swing until plane P occupied a position along line M. This may be considered as involving rotation about a transverse axis through the center O. In such rotation, the nozzle tip swings to the left. The dotted arc extending from each arrow head denotes its path of travel as the head is moved until plane P reaches line M. It is evident that the path of each arrow head (nozzle tip) has an axial component and a radial component, and that these vary according to the nozzle location in relation to the axis O. The radial displacements, in amount and direction, are shown by the lines at the upper left of Figure 5a, each pair of lines (a, b and c) being the lines representing the radial position of each of the nozzle tips (A, B, C) in the full contact positions of the head in the smaller and the larger bores.

It will be noted that location A involves a very considerable inward displacement of the nozzle tip, so that the change in orifice size (tip to wall) is considerably greater than the difference in the radii of the two bores. Location B involves the same in lesser degree; and in actual practice, considering the very small difference in angular position of the contact plane in different bores, the distance of nozzle B from the axis of the bore does not change materially, and the change in orifice size is therefore equal to the change in radius of the bore. Location C gives a reverse effect, in that the radial displacement is outward, and while the orifice size is increased the change in orifice size is less than the change in bore radius. By locating the nozzle far enough to the right of the center O, the orifice size may even be decreased for an increase in radius of the bore.

The further factor which bears on this relationship is the axial dimension of the head between the contact corners, or the transverse faces. This axial dimension determines how far off-center the nozzle may be located without being mounted out-board. It is evident from Figure 5a that with a longer axial face, nozzle C could be even farther to the right of axis O and would have an even greater radial displacement outward in going from the smallest to the largest bore. This axial dimension also determines the length and the slope of the contact plane P for a given set of dimensions of the transverse end faces.

It is desirable that the contact plane lie at a substantial angle to a right transverse plane when the head is in its full corner contact position in the bore; and this is a first consideration fixing a minimum axial dimension. This is to avoid the jamming and wedging that would occur if that angle were very small, and the consequent generation of forces which might deform the wall of the bore. I prefer an angle exceeding 15°. Thus with a head having end-faces on the order of from 1 to 2 inches square, I preferably make the axial dimension three eighths to one-half an inch.

Different use requirements dictate the relationship that is desirable between orifice change and bore change. If an amplified pressure change is desired, the location of the nozzle should be such that the change in orifice size exceeds the change in radius of bore. Generally however a one-to-one relationship is desirable, but where a relatively wide range of bore sizes is to be gaged with a single head an even lower ratio should be used. The amplified pressure effect incident to an amplified orifice change means that the head can not be used over such a wide range of bore sizes, the reason being that the escape orifice can not be enlarged indefinitely without losing its restrictive effect. In practice, the range of change in orifice size from the minimum to full pressure is usually but a few thousandths of an inch in radial distance, being .0015 inch for example in gages I have made. With a nozzle on-center (cf. B in Fig. 5a) this permits gaging over a range of 0.003 inch in diametral change. If the nozzle were located substantially to the left of center (cf. A in Fig. 5a) the range of bore size that could be gaged would be even less.

In the foregoing reference has been made to rotation of the head about a transverse axis O. This is to facilitate analysis of the effect of nozzle location. In actual use, the head is not ordinarily rotated about that axis but what is done is to bring two corners into contact and then tilt the head about them as a fulcrum until the other two corners engage the wall. This of course is equivalent to rotation about the axis O until all four corners are in contact with the wall.

In Figure 6 is shown a double-throw head in which advantage is taken of the foregoing characteristics with respect to nozzle location to provide a head which can be used in one direction of tilt to gage bores over one range of sizes, and in the other direction to gage over a wider range. Moreover, the dimensions may be so chosen that the change in size of the escape orifice is the same in either case in going from the bore of minimum size to that of maximum size for which the head is designed with respect to each direction of tilt, even though those ranges of bore size are different. In other words, the nozzle location is such that for the different directions of tilt there are different relationships between change in bore size and change in orifice size, the change in orifice size being however the same. In consequence, the range of pressure variation is the same for both directions of tilt and the pressure gage (or equivalent) may have either two scales, one calibrated for each range of bore sizes, or may have a single scale the indicated value on which is read directly when the head is tilted one way and is multiplied by some constant when the head is tilted the other way.

This head 40 (Figure 6) is like the head in Figures 2 and 4 except that at its lower side (as here shown) its axial dimension 41 is made longer than the corresponding dimension at the upper side. The respective diagonally opposite pairs of contact corners thus define two planes, $P_1$ and $P_2$, of different length and slope. With reference to plane $P_1$ and contact corners 1 and 3, the nozzle is symmetrically located and in line with the center of rotation, and gives substantially a one-to-one relationship of change in orifice size to change in bore size. With reference to plane $P_2$ and its contact corners 5 and 7, the nozzle is asymmetrical and to the left of the center of rotation. It therefore has a substantial radial displacement outward in swinging (clockwise) from the contact position of a smaller bore to that of a larger bore. Hence the change in orifice size is less than the change in bore size, and for the same total range of variation in orifice size there is a greater range of variation in bore size with which the head may be used in the direction of tilt employing plane $P_2$. Such a difference in the location of the nozzle relative to two centers of rotation may be obtained in various ways. For example, the two contact planes may be of the same size and slope, but the nozzle may be farther off-center in relation to the axis of one than the other.

The invention has been described in the foregoing in terms of heads which have, for any one direction of tilt, four outer contact corners which define a rectangular plane. This is preferable both because it is simpler to fashion such a head and because it is easier with it to find the position of full corner contact. A rectangular plane, or one in which the transverse edges are parallel, has its full contact position at right angles to the axis of the bore, and does not have to be skewed into position. This simplifies the manipulation of the head.

Considerable variation of shape of the head is possible however both within this preferred limitation to a rectangular contact plane and also beyond that limitation, provided that the four outer contact corners meet the basic requirement that they define a quadrilateral figure which intersects the axis of the bore so that it can occupy but one position of full corner contact in any one axial direction of tilt. It is possible for example to have (a) a head in which the four outer contact corners do not define a rectangle, but define a quadrilateral plane figure having two parallel sides and two which are not parallel, as in Figure 7; or (b) a head in which the four corners define a quadrilateral plane figure having no parallel sides as in Figure 8; or (c) one in which the four corners do not even define a plane, but do define a quadrilateral figure (capable of resolution into two contiguous triangles) which intersects the axis of the bore as in Figures 9a and 9b. These figures (7–9) show only the shape defined by the four outer contact corners. The full shape of the head may be anything consistent and suitable for providing the handle mounting and fluid passage. All such heads having four outer contact corners possess the common characteristic that the head can be tilted axially to but one position of full corner contact when tilted or rotated in a given direction. Reference to axial tilting is intended to include the tilting involved in bringing any of these shapes of head to its full corner contact position, since even when skewing is necessary there is an axial component of tilt from a free position.

The invention has been described also in terms of heads in which the nozzle is at the top side of the head in the position of the head used here for illustration. It can as well be on the bottom side, or it can be on one of the sides shown as vertical provided it does not lie so close to a contact corner as to be equidistant from the wall in bores of different size. When located on the top or bottom side, its location relative to the axis of rotation should of course not be such that there is little or no change in orifice size in bores of different size.

The four outer contact points are described here as corners, and in the illustrative forms they are the corners between adjacent sides of the head. They could be formed otherwise, as for example by projections from the main body of the head. Such variations are within the broad meaning of the word corners, giving four-point contact with the wall. These and other variations from the illustrative forms are to be considered within the scope of the appended claims read in the light of the doctrine of equivalents.

I claim:

1. For a pneumatic gage, a gaging head small enough to fit within the bore to be gaged, said head having a set of four diagonally opposed contact corners projecting therefrom, the corners being disposed axially of the head as the defining points of a quadrilateral figure which is inclined with respect to the axis of the bore to be gaged when the head is in a tilted position to bring the four corners into contact with the wall of the bore, and a fluid outlet located at one side of the head to form with the wall of the bore a fluid escape orifice of size dependent upon the dimension of the bore when the four corners of the head are in contact with the bore wall.

2. For a pneumatic gage, a gaging head small enough to fit within the bore to be gaged, said head having a set of four diagonally opposed contact corners projecting therefrom, the corners being disposed axially of the head as the defining points of a quadrilateral figure which is inclined with respect to the axis of the bore to be gaged when the head is in a tilted position to bring the four corners into contact with the wall of the bore, and a fluid outlet located in the side wall of the head intermediate the contact corners to form with the wall of the bore a fluid escape orifice of size dependent upon the dimension of the bore when the four corners of the head are in contact with the bore wall.

3. For a pneumatic bore gage, a gaging head having a set of four diagonally opposite upper and lower outer contact corners, extending therefrom and defining a quadrilateral figure sloping to intersect the axis of the bore to be gaged, said head having transverse end faces whose greatest dimensions are less than the smallest bore diameter to be gaged, the axial dimension of the head being such that the diagonal of said figure exceeds the diameter of the largest bore to be gaged, and a fluid outlet at a side of the head and located to form with the wall of the bore an escape orifice of size dependent on the size of the bore when the head is tilted axially to full corner contact with the wall.

4. For a pneumatic bore gage, a gaging head having a set of four diagonally opposite upper and lower outer contact corners, defining a quadrilateral plane sloping to intersect the axis of the bore to be gaged, said head having transverse end faces whose greatest dimensions are less than the smallest bore diameter to be gaged, the axial dimension of the head being such that the diagonal of said plane exceeds the diameter of the largest bore to be gaged, and a fluid outlet at a side of the head and located to form with the wall of the bore an escape orifice of size dependent on the size of the bore when the head is tilted axially to full corner contact with the wall.

5. For a pneumatic bore gage, a gaging head having two sets of diagonally opposite upper and lower outer contact corners, four in each set, defining two quadrilateral figures of opposite slope intersecting the axis of the bore to be gaged, said head having transverse end faces whose greatest dimensions are less than the smallest bore diameter to be gaged, the axial dimension of the head being such that the diagonals of said planes exceed the diameter of the largest bore to be gaged, and a fluid outlet at a side of the head and located to form with the wall of the bore an escape orifice of size dependent on the size of the bore when the head is tilted axially to full corner contact with the wall at either of said sets of corners.

6. A gaging head according to claim 5 in which said figures are planes.

7. A gaging head according to claim 5 in which said figures are rectangular planes.

8. A gaging head according to claim 5 in which said figures are of identical size and shape and the fluid outlet is symmetrically located with respect to them.

9. A gaging head according to claim 5 in which said figures are identical rectangular plane figures and the fluid outlet is symmetrically located with respect to said planes.

10. A gaging head according to claim 5 in which said figures are rectangular planes and the fluid outlet is so located at a different relative relation to the transverse axis of rotation of the respective planes, whereby to give different relations of change in orifice size to change in bore size.

11. A gaging head according to claim 5 in which said figures are rectangular planes each having a different slope with respect to the axis of the head, and the fluid outlet is so located as to have a different relation to the transverse axis of rotation of the respective planes, whereby to give different relations of change in orifice size to change in bore size.

12. For a pneumatic bore gage, a generally rectangular gaging head having two sets of diagonally opposite upper and lower outer contact corners, four in each set, defining two rectangular planes of opposite slope intersecting the axis of the bore to be gaged, said head having transverse end faces whose diagonals are less than the smallest diameter to be gaged, and having an axial dimension such that the diagonals of said planes exceed the diameter of the largest bore to be gaged, and a fluid outlet at a side of the head and located to form with the wall of the bore an escape orifice of size dependent on the size of the bore when the head is tilted axially to full corner contact with the wall at either of said sets of corners.

13. For a pneumatic bore gage, a gaging head having two sets of diagonally opposite upper and lower outer contact corners, four in each set, defining two rectangular plane figures which intersect each other and the axis of the bore to be gaged, said head being of a size to fit within the smallest bore to be gaged, and having different axial dimensions between the respective upper corners and lower corners of said sets, and a fluid outlet at one side of the head and located to form with the wall of the bore an orifice of size dependent on the size of the bore when the head is tilted into contact with the wall at either of said sets of corners, the said outlet being located at a point which in the axial dimension of said head is closer to the transverse axis of rotation of one of said rectangular planes than to the like axis of the other.

OSWALD C. BREWSTER.

References Cited in the file of this patent

UNITED STATES PATENTS

| Number | Name | Date |
|---|---|---|
| 1,159,025 | Hess | Nov. 2, 1915 |
| 1,793,763 | Tornebohm | Feb. 24, 1931 |
| 2,370,219 | Aller | Feb. 27, 1945 |
| 2,392,016 | Wattebot | Jan. 1, 1946 |
| 2,446,071 | Aller | July 27, 1948 |
| 2,472,139 | Aldeborgh et al. | June 7, 1949 |
| 2,590,170 | Gates | Mar. 25, 1952 |